(12) United States Patent
Black

(10) Patent No.: US 10,650,378 B2
(45) Date of Patent: May 12, 2020

(54) CUSTOMER VERIFICATION

(71) Applicant: NCR Corporation, Duluth, GA (US)

(72) Inventor: Jonathan Black, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 13/720,119

(22) Filed: Dec. 19, 2012

(65) Prior Publication Data

US 2014/0172703 A1 Jun. 19, 2014

(51) Int. Cl.
*G06Q 20/40* (2012.01)
*G07F 19/00* (2006.01)

(52) U.S. Cl.
CPC ....... *G06Q 20/40145* (2013.01); *G07F 19/20* (2013.01); *G07F 19/203* (2013.01)

(58) Field of Classification Search
CPC ........ G06Q 20/00; G06Q 30/00; G06Q 40/00; G06Q 10/00
USPC ...................................... 705/3–44; 704/3–44
See application file for complete search history.

(56) References Cited

U.S. PATENT DOCUMENTS

| | | | | |
|---|---|---|---|---|
| 5,991,750 A * | 11/1999 | Watson | ................... | G06Q 20/00 705/2 |
| 6,991,156 B1 * | 1/2006 | Somers, Jr. | ................... | 235/379 |
| 7,091,826 B2 * | 8/2006 | Hayakawa | ................... | 340/5.82 |
| 7,447,494 B2 * | 11/2008 | Law | ................... | G06Q 20/0855 455/410 |
| 8,069,120 B2 * | 11/2011 | Buehler | ................... | G06Q 20/04 705/30 |
| 8,141,135 B2 * | 3/2012 | Nagami et al. | ................... | 726/5 |
| 8,195,574 B2 * | 6/2012 | Buehler | ................... | G06Q 20/04 705/64 |
| 8,676,639 B2 * | 3/2014 | Perlman | ............. | G06Q 30/0212 705/14.1 |
| 2009/0177582 A1 * | 7/2009 | Cucinotta | ............ | G06Q 20/042 705/44 |
| 2009/0189736 A1 * | 7/2009 | Hayashi | ....................... | 340/5.81 |
| 2010/0182123 A1 * | 7/2010 | Press | ........................... | 340/5.28 |
| 2010/0205063 A1 * | 8/2010 | Mersky | ........................... | 705/17 |
| 2010/0303286 A1 * | 12/2010 | Kim | ............................... | 382/100 |
| 2011/0087611 A1 * | 4/2011 | Chetal | ........................... | 705/325 |
| 2011/0106668 A1 * | 5/2011 | Korosec et al. | ................. | 705/30 |
| 2011/0246316 A1 * | 10/2011 | Cincera | .............. | G06Q 20/1085 705/17 |
| 2011/0288874 A1 * | 11/2011 | Hinkamp | ....................... | 705/1.1 |
| 2014/0172703 A1 * | 6/2014 | Black | ............... | G06Q 20/40145 705/43 |

OTHER PUBLICATIONS

Zak Stambor, "Have Wireless Terminals Finally Found Their Niche ?", Merchant Payment Trends, Cards&Payment, Jan. (Year: 2007).*
Karen Epper Hoffman, "Electronic Bill Payment Comes of Age", Community Banker, Jul. (Year: 2002).*

* cited by examiner

*Primary Examiner* — Frantzy Poinvil
(74) *Attorney, Agent, or Firm* — Schwegman, Lundberg & Woessner

(57) ABSTRACT

A method and apparatus are disclosed for identifying a user. The method includes the steps of determining at least one biometric parameter associated with a user at a terminal, determining a plurality of active users associated with the terminal and comparing the determined biometric parameter with corresponding biometric parameters of the active users.

13 Claims, 4 Drawing Sheets

CUSTOMER VERIFICATION

FIELD OF THE INVENTION

The present invention relates to a method and apparatus for identifying a user. In particular, but not exclusively, the present invention relates to a method of identifying a user at a user terminal using a biometric parameter and subsequently executing a transaction for a duly identified user.

BACKGROUND TO THE INVENTION

Various terminals are known by which a user can identify themselves at a user interface of the terminal and thereafter carry out an activity. For example, Self-Service Terminal (SSTs) such as Automated Teller Machines (ATMs) are known and users can identify themselves at such terminals via a token such as a bank card and inputting a PIN. Once identified, users can carry out a transaction at the terminal such as receiving or depositing currency or checks. Carrying out a transaction at such a terminal can, however, on occasion be a time consuming process as a user must input a token such as a bank card to identify themselves. Such tokens can be lost or defaced so that a user is no longer able to identify themselves. Users must also remember a PIN.

Mobile phones have been proposed as an identification medium, however, there are a number of problems known with such use. For example, there are a wide range of mobile devices with disparate capabilities. Some solutions have been suggested whereby such a mobile device such as a smartphone is used to display an authorizing sign such as a QR code or the like. However, reading a QR code generated on a mobile terminal using a camera at the terminal requires a customer to perform an indirect action with the mobile device first displaying the QR code at the terminal. Such actions are prone to user error and themselves can be time consuming.

Executing a biometric challenge at a terminal has been suggested to at least partially overcome such problems. However, taking a fingerprint and/or iris scan and then comparing the created template in a recognition cycle is highly data intensive, can be a time consuming process and is prone to error.

SUMMARY OF THE INVENTION

It is an aim of the present invention to at least partly mitigate the above-mentioned problems.

It is an aim of certain embodiments of the present invention to enable one or more transactions to be pre-staged for completion at one or more terminals and then use biometric identification to determine if a transaction should be executed at the terminal.

It is an aim of certain embodiments of the present invention to enable biometric identification to be used to authorize a transaction at a terminal without the need for a full recognition analysis of all possible users of the terminal to be carried out at a terminal.

It is an aim of certain embodiments of the present invention to enable someone to present their biometric at a fulfillment terminal and a pre-staged transaction to be executed if a match is determined, for the submitted biometric data, against users associated with the terminal.

According to a first aspect of the present invention there is provided a method of identifying a user, comprising the steps of:

determining at least one biometric parameter associated with a user at a terminal;
determining a plurality of active users associated with said terminal; and
comparing the determined biometric parameter with corresponding biometric parameters of the active users.

Aptly, the method further comprises the steps of:
determining said active users by determining a plurality of potential users of the terminal, said potential users being located in a region associated with the terminal.

Aptly, the method further comprises determining where the terminal is located via a GPS enabled transceiver at the terminal.

Aptly, the method further comprises determining where the terminal is located by providing a pre-stored latitude and longitude allocated to the terminal.

Aptly, the method further comprises determining potential users of the terminal by determining a plurality of subscribers or members of a pre-determined organization.

Aptly, the method further comprises determining potential users of the terminal by determining users that have previously performed a pre-determined operation.

Aptly, the step of determining if users have previously performed a pre-determined operation comprises determining if a user has pre-staged a transaction executable at the terminal.

Aptly, the method further comprises determining if the user has pre-staged the transaction within a pre-determined period of time prior to said step of determining the biometric parameter of the user.

Aptly, the method further comprises determining said biometric parameter by reading a fingerprint and/or iris of said user via a reader device at the terminal.

Aptly, the method further comprises providing said biometric parameter from the terminal to a remote server node via a network;
at the server node comparing the parameter with parameter data associated with said active users stored in a data store at the server node; and
determining an identity of a user responsive to said comparison step.

According to a second aspect of the present invention there is provided a method of executing a transaction at a terminal, comprising the steps of:
identifying a user via the steps of determining at least one biometric parameter associated with a user at a terminal;
determining a plurality of active users associated with said terminal; and
comparing the pre-determined biometric parameter with corresponding biometric parameters of the active users; and
executing a transaction at the terminal if the user is identified as a verified user.

Aptly, the terminal is an Automated Teller Machine (ATM) and the transaction comprises dispensing currency notes.

According to a third aspect of the present invention there is provided a server for communicating with a terminal that selectively executes transactions, wherein the server is operable to:
receive at least one biometric parameter associated with a user at the terminal;
determine a plurality of active users associated with the terminal;

identify if said a user is a verified user by determining if said biometric parameter matches a corresponding biometric parameter of one of the active users; and notifying the terminal that the user is a verified user.

Aptly, the server is operable to:

determine the plurality of active users associated with the terminal by selecting a table of active users associated with the terminal from a plurality of tables of active users stored at the server and associated with a corresponding plurality of terminals that selectively communicate with the server.

According to a fourth aspect of the present invention there is provided a method of identifying a user, comprising the steps of:

determining if a biometric parameter of a user of a terminal matches a biometric parameter of one of a plurality of active users associated with the terminal.

Certain embodiments of the present invention enable a service to be provided to a user of a terminal or a transaction to otherwise be carried out at a terminal with no card or other such physical token being needed to authorize execution of the transaction.

Certain embodiments of the present invention provide an improved user experience in terms of a user interaction needed at a terminal in order to execute a transaction.

Certain embodiments of the present invention enable one or more biometric parameters such as a part or whole of an iris pattern or fingerprint pattern or other such template to be captured at a terminal and utilised to identify a user and determine whether such a user has been qualified to receive a service by executing a transaction.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
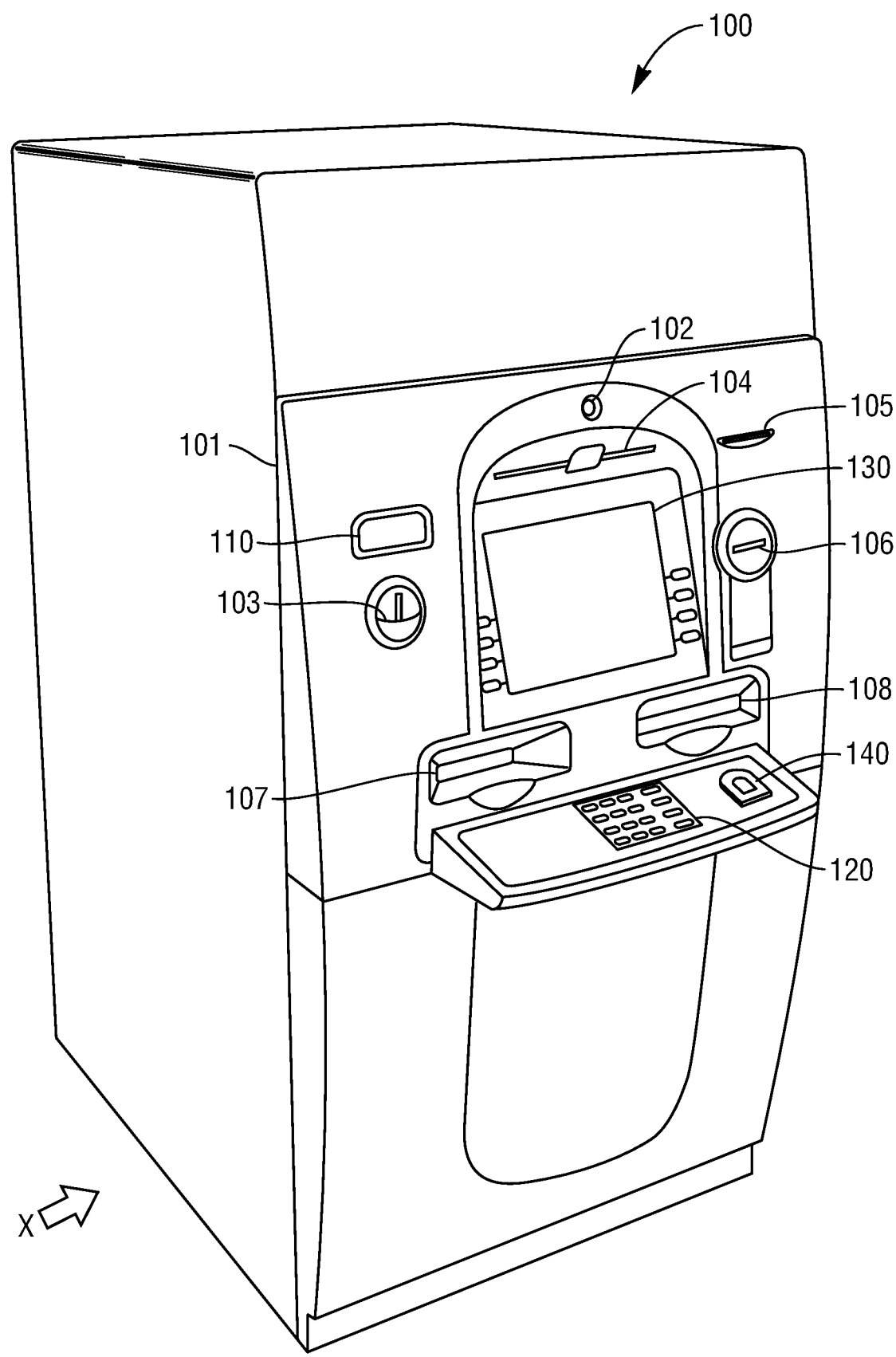
FIG. 1 illustrates a schematic diagram of a Self-Service Terminal (SST) in the form of an Automated Teller Machine (ATM) according to an embodiment of the present invention.

In the drawings like reference numerals refer to like parts.

FIG. 1 illustrates an Automated Teller Machine (ATM) 100 according to an embodiment of the present invention. It will be appreciated that certain embodiments of the present invention are broadly applicable to a wide variety of terminals at which a user is to identify themselves and then, subsequent to a successful verification, a transaction is to be executed. For example, checks and/or currency notes and/or gyros can be dispensed to a user or deposited by a user. It will be appreciated that certain embodiments of the present invention are not restricted to use with sheet-like items of media but are more broadly applicable wherever a transaction should be executed to provide a user with a service or item or to allow a user to deposit an item or carry out a service. The type of terminal is of course appropriate for the type of item which is the subject of a transaction. Certain embodiments of the invention allow a broad range of services to be pre-staged and then executed. For example, access can be provided to a restricted zone or the like.

As illustrated in FIG. 1, the ATM 100 in the example given includes a fascia 101 coupled to a chassis (not shown). The fascia 101 defines an aperture 102 through which a camera (not shown) images a customer of the ATM 100. The fascia 101 also defines a number of slots for receiving and dispensing media items and a tray 103 into which coins can be dispensed. The slots include a statement output slot 104, a receipt 105, a card reader slot 106, a cash dispense slot 107, a cash and check deposit slot 108 and a branding badge. The slots and tray are arranged such that the slots and tray align with corresponding ATM modules mounted within the chassis of the ATM.

The fascia 101 provides a user interface for allowing an ATM customer to execute a transaction. The fascia 101 includes an encrypting keyboard 120 for allowing an ATM customer to enter transaction details. A display 130 is provided for presenting screens to an ATM customer. A fingerprint reader 140 is provided for reading a fingerprint of an ATM customer to identify the ATM customer, as will be described hereinbelow in more detail. It will be understood that a fingerprint reader is a device for extracting biometric information associated with an individual customer. Certain embodiments of the present invention are not restricted to the use of fingerprint readers but are more broadly applicable to utilization at a terminal of a biometric reader. A biometric may be a fingerprint or iris scan or other such feature which is unique and associated with only a single user.

Figure 2:
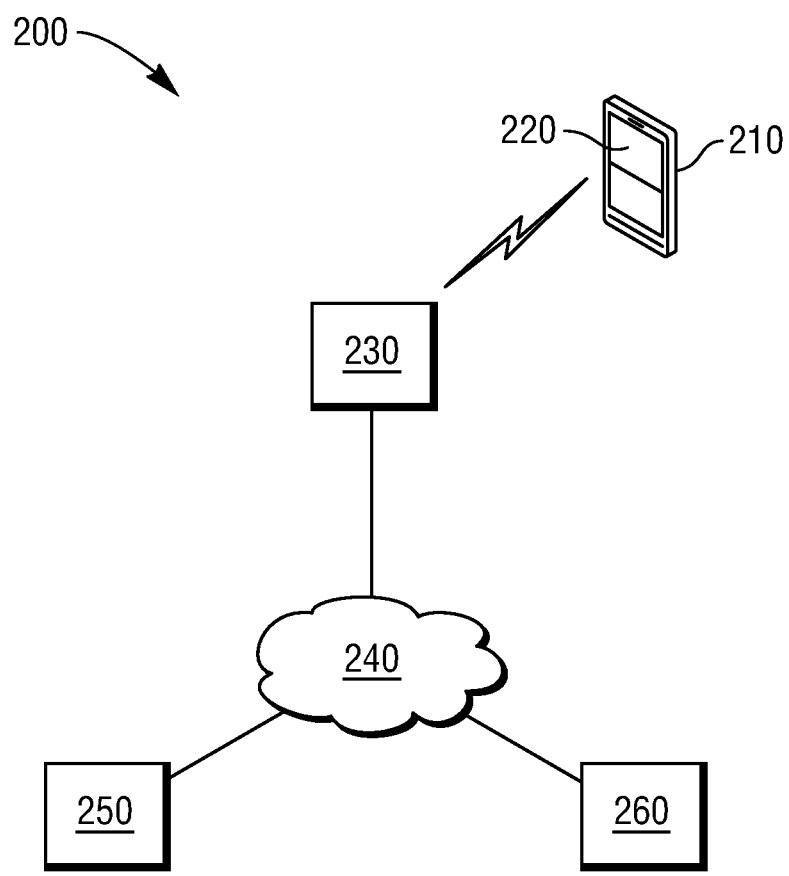
FIG. 2 illustrates a system utilized to identify a user and subsequently execute a transaction.

FIG. 2 illustrates a system utilized to identify a user at a terminal and subsequently execute a transaction. The user (in the example described a customer of a banking network including one or more ATMs) is in possession of a mobile device such as a smartphone mobile terminal 210. The mobile telephone 210 includes a user interface 220 which includes a display and input keyboard (which may be a touchscreen or multiple keys or the like). The mobile terminal 210 communicates wirelessly with a telecommunication network 230 which is linked to a network such as the internet 240. The internet 240 is connected to a mobile communication gateway 250 which is utilized when a customer wishes to pre-stage a transaction to be executed at a terminal. Connections can of course be wireless or wired. In this way, a user can select a transaction to be executed at a terminal and set that transaction up for execution. Subsequently, a user only needs to visit a respective terminal and identify themselves via a biometric input to have a transaction carried out. For example, a user may request, via the user interface 220 of the mobile telephone 210 that an ATM dispense £200 to the user. Once this transaction is pre-staged (having been duly authorized by a banking network 260) then the user can visit an appropriate ATM to receive the money. There is no subsequent need for a user to identify themselves with a physical token such as a bank card at the ATM.

The banking network 260 including the ATM is connected to the gateway 250 via the internet 240. The banking network 260 represents a network of terminals which can be utilized to identify a user when they are present at the terminal. Optionally, a transaction is then executed to provide the duly identified user with a pre-determined service or goods or item.

Figure 3:
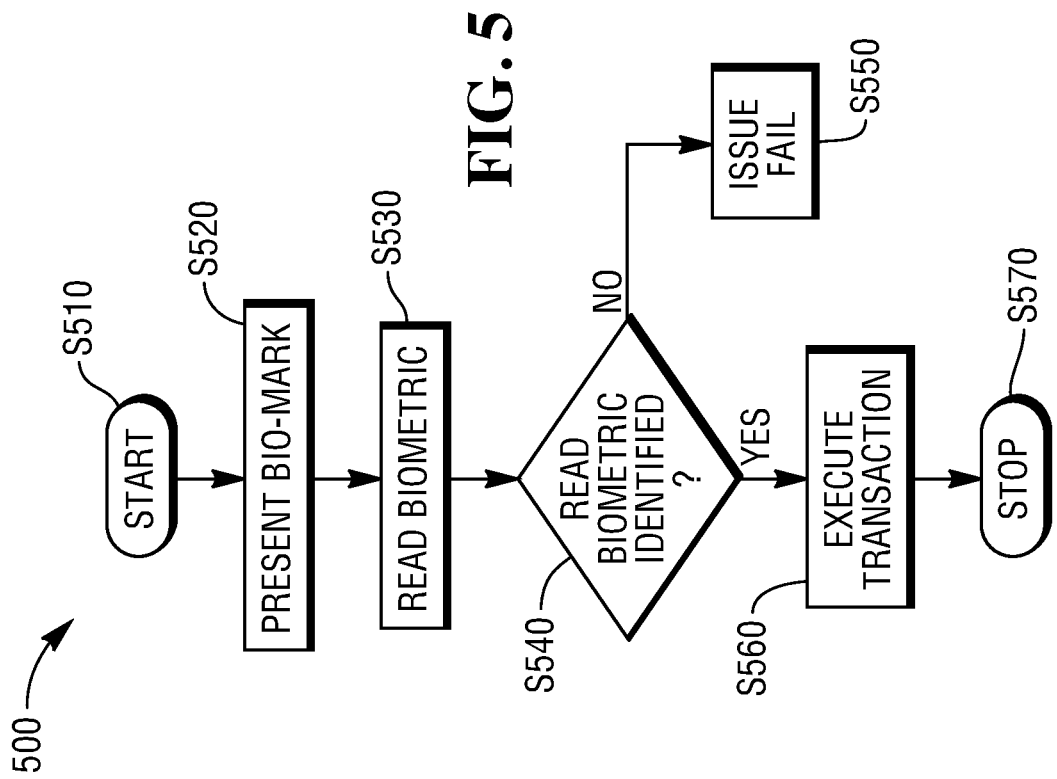
FIG. 3 illustrates pre-staging a transaction to be executed at a terminal.

FIG. 3 illustrates the pre-staging of a transaction by a user. The pre-staging process 300 is begun at step S310 by a user determining that they wish to execute a transaction at a terminal. For example, that they wish to receive a predetermined amount of currency from one or more specific ATM terminals. The user, having previously downloaded an app onto their smartphone mobile telephone, selects that app at step S320. The app automatically displays a page on the user interface (such as a screen) and a user inputs relative input data using a keypad or the like at step S330. For example, the user indicates that they wish to receive £200 from an ATM which will be duly deducted from their account. Account details are aptly pre-stored during a set up stage (not shown). The input data is sent from the mobile telephone at step S340 and includes location data associated with the location of the mobile telephone 210 at that moment in time. This location information may be provided by any particular technique such as via GPS, triangulation or providing a location of a wireless hub supplying a Wi-Fi connection to the mobile device.

The User Interface (UI) data (i.e. input data) and location data is forwarded to the gateway 250 which verifies that a transaction can be executed. For example, by identifying that the user is a customer of a particular banking network or a member of a particular organization and determining that the customer has sufficient funds or is in some other way authorized. The step of verifying the transaction is illustrated by step S350 in FIG. 3. At step S360, confirmation or denial of the pre-staging of a transaction is indicated to a user. This is carried out by forwarding data back to the user interface of the mobile telephone. Once a transaction has been pre-staged or an attempt to pre-stage a transaction has been indicated as a failure, the process stops at step S370. Confirmation of the pre-staging sets a start time. A predetermined period of time (for example 20 minutes, 1 day, 1 week or 1 month or the like) is then allowed for the transaction to be completed.

Figure 4:
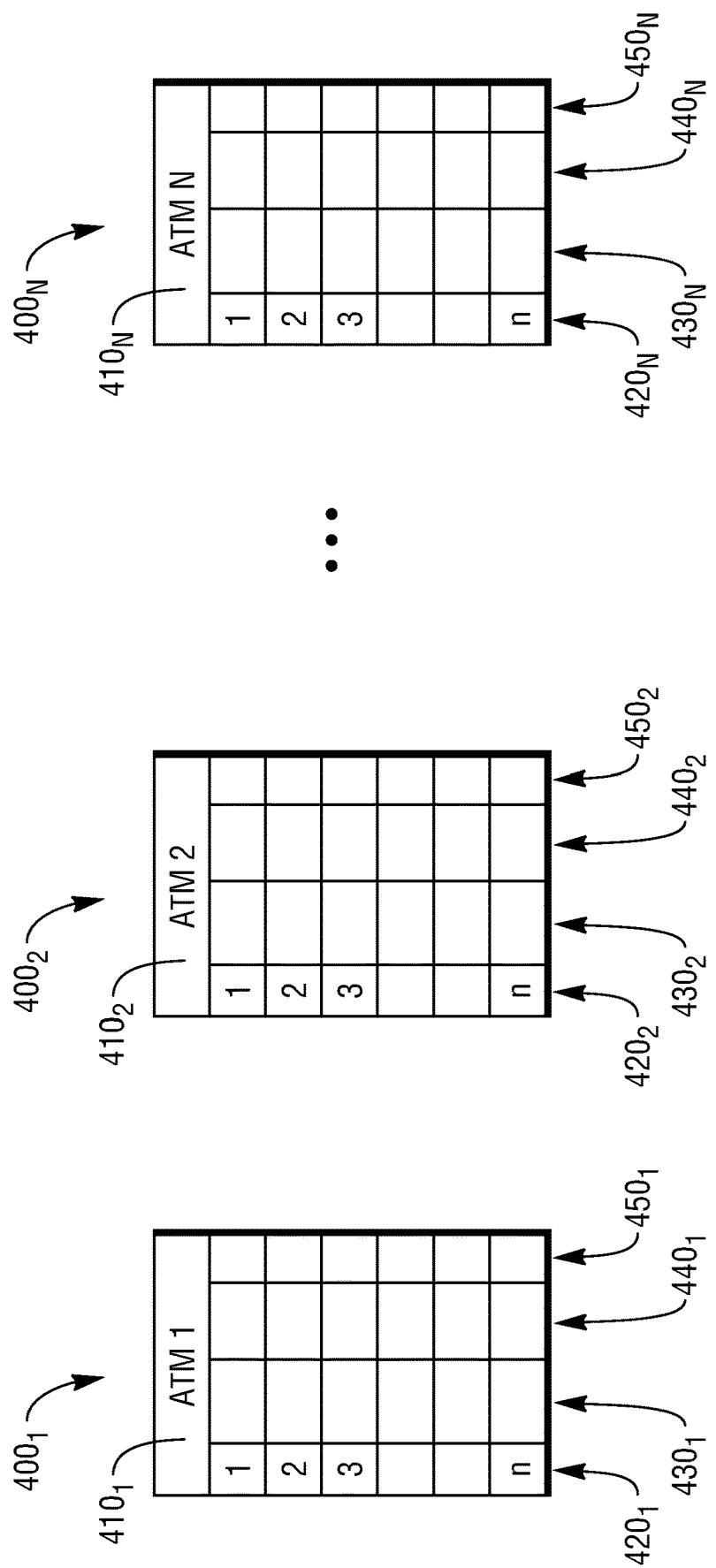
FIG. 4 illustrates multiple active lists for terminals that can provide a service or otherwise execute a transaction.

FIG. 4 illustrates active lists which are each associated with a respective one ATM of the banking network. Each terminal in the banking network is allocated a respective active list and these details are kept up to date at the banking network node 260. As members of an organization or, in the case of the example given, customers of a financial institution pre-stage transactions, the banking network receives a location identifier of the mobile terminal where the transaction is pre-staged together with details of what transaction is to be executed together with timing information indicating when the pre-staging was carried out and thus how long in time that pre-staged transaction is to be left valid. When the user of the mobile telephone 210 pre-stages a transaction, they will be in a location within a pre-determined distance of one or more specific ATMs (or terminals where a specific transaction can be executed). For example, if the mobile telephone is used in a city scape location, twenty ATMs may be within 2 miles of the mobile terminal. The banking network uses the location information and pre-stored information identifying a location of each ATM in the banking network. For each terminal within a pre-determined distance, details of the user are associated together with details of the transaction together with details by when the transaction must be executed. Such information is written into the active lists of all terminals within that distance. For example, as shown in FIG. 4, an active list $400_{1, 2 \ldots N}$ is shown for the N terminals within 2 miles of the mobile terminal shown in FIG. 2. A unique terminal ID $410_{1, 2 \ldots N}$ uniquely identifies the active list and is uniquely associated with a one ATM in the banking network. A first column $420_{1, 2 \ldots N}$ identifies a plurality of transactions which have been pre-staged for that terminal. For each terminal 1 to n transactions may be stored in the active list. A next column $430_{1, 2 \ldots N}$ identifies a name, account detail and transaction details of a transaction which is to be executed at a terminal. A next column $440_{1, 2 \ldots N}$ includes a biometric template such as a fingerprint or iris scan associated with a customer who has pre-staged that particular entry. This information has previously been gathered for a customer using the service. A further column $450_{1, 2 \ldots N}$ includes time information indicating an end point by which a pre-staged transaction should be carried out. Thus, for each terminal there is an active list including transaction details, biometric information of a person that should present themselves to execute that transaction, and an end point in time which must be checked so that transactions are executed before that end point. In this way, transactions can be associated with terminals on a server and subsequent enquiries can retrieve the current associated transactions for a given device.

Figure 5:
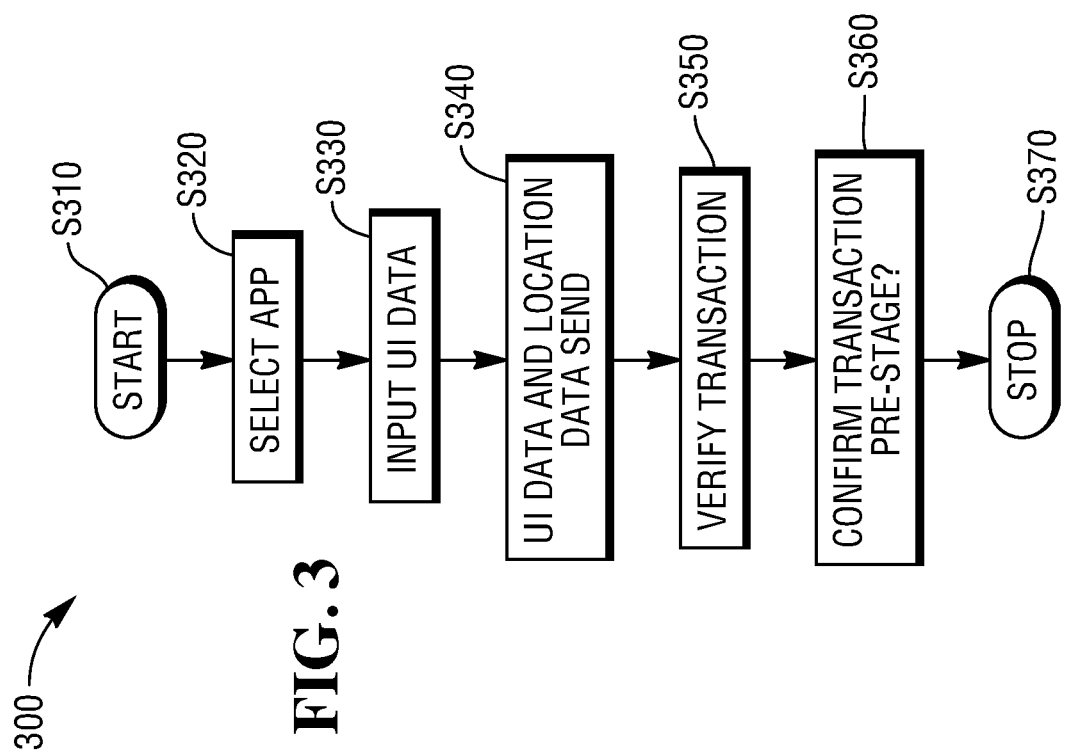
FIG. 5 illustrates the execution of a pre-staged transaction.

FIG. 5 illustrates execution of a transaction at a terminal subsequent to an identification being successfully carried out. The execution/identification process 500 starts at step S510 with a user at a terminal identifying that they wish to execute a pre-staged transaction or identify themselves. This is carried out by a user interacting with the user interface 130 of the ATM 100. At step S520, the user places a finger on the fingerprint reader 140 or otherwise presents a biometric feature that can be used as a biomark. This biomark is read by the ATM 100 at step S530. At step S540, the read biometric is compared with the biometric template $440_{1, 2 \ldots N}$ for the terminal 100 where the user is attempting to identify themselves. Rather than compare the read biometric against all possible users of a banking network, the read biometric need only be compared against a small subset of that total number. The read biomark is compared only with the biometric entry for each pre-staged transaction in the active list of that terminal only. If the biometric submitted at the terminal by the user does not match a biometric template stored in an active list for that terminal, then a failure message is indicated at step S550.

If the user is duly identified then a pre-staged transaction is executed at step S560. For example, the currency which the user requested via the smartphone 210 is dispensed via the ATM 100 and the process 500 stops at step S570. The entry for that transaction in the active list of all relevant terminals is then deleted. Certain embodiments of the present invention thus use a combination of a fulfillment device (in the form of a terminal or the like) that is location aware and pre-staging of a transaction via a mobile device which is also location aware. This limits the number of comparisons to relevant/active customers that must be carried out. The pre-staged transaction is only available for a set period of time and only available on devices within a given distance where the transaction was pre-staged.

Aptly, according to certain further embodiments of the present invention a user may use a mobile device or non-mobile device to pre-stage a transaction remotely from a location where the pre-staged transaction is to be executed. For example, if a customer knows that they are visiting a city the next day, the night before they can access a website via a PC or launch an app on a mobile phone and identify a location, such as a street in a city or ticket distribution terminal at a sports arena or concert arena to pre-stage the transaction.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method, for conducting a pre-staged transaction using a machine, the machine configured to perform the method, the method including operations comprising:
    determining at least one biometric parameter of a user by scanning the user with a biometric reader device of the machine;
    retrieving, from a data store of the machine, a list of a plurality of active users associated with the machine;
    determining, using logic of the machine, said plurality of active users by determining a plurality of potential users of the machine, said potential users being located in a region associated with the machine; and
comparing using the logic of the machine, the at least one biometric parameter with corresponding biometric parameters of the plurality of active users;
    determining, using the logic of the machine, the pre-staged transaction associated with the user based on results of the comparison;
    modifying a user interface displayed on a display of the machine to present information related to the pre-staged transaction; and
    conducting the pre-staged transaction using the logic of the machine based on the results of the comparison;
    wherein the pre-staged transaction is determined and conducted using the user interface and the machine without using a physical token or a personal identification number (PIN).

2. The method in claim 1, further comprising:
    wherein comparing the at least one biometric parameter with corresponding biometric parameters of the plurality of active users includes comparing the at least one biometric parameter with corresponding biometric parameter's of the plurality of potential users of the machine, the plurality of potential user's of the machine including a smaller subset of all possible users of a banking network.

3. The method in claim 2, further comprising:
    determining, using the logic of the machine, where the machine is located via a Global Positioning Satellite (GPS) enabled transceiver of the machine.

4. The method in claim 2, further comprising:
    determining, using the logic of the machine, where the machine is located by retrieving, from the data store of the machine, a pre-stored latitude and longitude allocated to the machine.

5. The method in claim 2, further comprising:
    determining, using the logic of the machine, potential users of the machine by determining a plurality of subscribers or members of a pre-determined organization.

6. The method in claim 2, further comprising:
    determining, using the logic of the machine, potential users of the machine by determining users that have previously performed a pre-determined operation at the machine or at another machine of a network, the network including the machine.

7. The method in claim 6 wherein determining potential users further includes determining users that have a pre-staged transaction associated with the user executable at the machine.

8. The method in claim 1, further comprising:
    determining, using the logic of the machine, if the pre-staged transaction was established within a pre-determined period of time prior to said step of determining the at least one biometric parameter of the user.

9. The method in claim 1, further comprising:
    determining, using the logic of the machine, said at least one biometric parameter by reading a fingerprint and/or iris of said user using the biometric reader device of the machine.

10. The method in claim 1, further comprising:
    sending, using the logic of the machine, said at least one biometric parameter from the machine to a remote server node via a network;
    at the server node comparing the parameter with parameter data associated with said active users stored in a data store at the server node, and
    determining, using the logic of the server node, an identity of the user responsive to said comparison step.

11. The method in claim 10, wherein the machine is an Automated Teller Machine (ATM) and the pre-staged transaction comprises dispensing currency notes.

12. A server for communicating with a machine that selectively executes transactions, wherein the server is operable to:
    receive, at the server, at least one biometric parameter associated with a user at the machine, wherein the at least one biometric parameter is determined from a scan of the user by a biometric reader device of the machine;
    retrieve, from a data store of the server, a list of a plurality of active users associated with the machine;
    determine, using a logic of the server, the plurality of active users associated with the machine by selecting a table of active users associated with the machine from a plurality of tables of active users stored in the data store at the server and associated with a corresponding plurality of machines that selectively communicate with the server;
    compare, using the logic of the server, the at least one biometric parameter to biometric parameters corresponding to the plurality of active users, the biometric parameters stored in the data store of the server;
    determine, using the logic of the server; a pre-staged transaction associated with the user based on results of the comparison; and send a modified user interface to the machine for display on a display of the machine, the modified user interface including information related to the pre-staged transaction;

and wherein the pre-staged transaction is determined and conducted using the user interface and the machine without using a physical token or a personal identification number (PIN).

13. At least one non-transitory machine readable medium, including instructions for conducting a pre-staged transaction using a machine, the instructions causing the machine to perform operations to:

determine at least one biometric parameter of a user by scanning the user with a biometric reader device of the machine;

retrieve, from a data store of the machine, a list of a plurality of active users associated with the machine;

determine, using a logic of the machine, said plurality of active users by determining a plurality of potential users of the machine, said potential users being located in a region associated with the machine;

compare the at least one biometric parameter with corresponding biometric parameters of the plurality of active users;

determine that the pre-staged transaction is associated with the user based on results of the comparison;

modify a user interface displayed on a display of the machine to present information related to the pre-staged transaction;

conduct the pre-staged transaction based on the results of the comparison; and wherein the pre-staged transaction is determined and conducted using the user interface and the machine without using a physical token or a personal identification number (PIN).

* * * * *